United States Patent [19]
Milnes et al.

[11] Patent Number: 6,118,492
[45] Date of Patent: *Sep. 12, 2000

[54] GUIDE SYSTEM AND METHOD OF OPERATION

[75] Inventors: Kenneth A. Milnes, Fremont; Steven M. Schein, Menlo Park, both of Calif.

[73] Assignee: Starsight Telecast, Inc., Fremont, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/884,376

[22] Filed: Jun. 27, 1997

Related U.S. Application Data

[60] Provisional application No. 60/023,692, Aug. 14, 1996.

[51] Int. Cl.$^7$ ..................................................... H04N 5/445
[52] U.S. Cl. ........................... 348/563; 348/565; 348/906; 345/327
[58] Field of Search ..................................... 348/563, 564, 348/565, 906; 345/327

[56] References Cited

U.S. PATENT DOCUMENTS

| | | |
|---|---|---|
| 4,199,781 | 4/1980 | Doumit . |
| 4,706,121 | 11/1987 | Young . |
| 5,353,121 | 10/1994 | Young et al. . |
| 5,357,276 | 10/1994 | Banker et al. . |
| 5,436,676 | 7/1995 | Pint et al. . |
| 5,585,838 | 12/1996 | Lawler et al. . |
| 5,606,374 | 2/1997 | Bertram . |
| 5,758,257 | 5/1998 | Herz et al. ................................. 455/2 |
| 5,781,246 | 7/1998 | Alten et al. ............................. 348/569 |
| 5,793,438 | 8/1998 | Bedard ................................... 348/569 |

FOREIGN PATENT DOCUMENTS

WO 95/01057  1/1995  WIPO .

*Primary Examiner*—Thomas G. Black
*Assistant Examiner*—Uyen Le
*Attorney, Agent, or Firm*—Christie, Parker & Hale, LLP

[57] ABSTRACT

A system and method for displaying a simplified electronic program schedule guide on a user's television monitor is provided. In one embodiment, the program schedule guide is abbreviated to include only the programs currently available for viewing on a subset of the available channels. In another embodiment, the program guide screen visually distinguishes between programs for the convenience of the viewer.

5 Claims, 6 Drawing Sheets

GUIDE SYSTEM AND METHOD OF OPERATION

CROSS REFERENCE TO RELATED APPLICATION

This application is a nonprovisional application of U.S. provisional patent application "GUIDE SYSTEM AND METHOD OF OPERATION," U.S. Ser. No. 60/023,692, filed Aug. 14, 1996, having Kenneth A. Milnes and Steven Schein as the inventors and assigned to StarSight Telecast, Inc.

BACKGROUND OF THE INVENTION

The present invention relates generally to a program schedule guide and, more particularly, to a system and process for allowing a television viewer to access on-screen television program listings in an easy and convenient way.

The number of television channels available to the user has grown dramatically within the last decade, primarily due to the availability of cable and direct broadcast satellite systems. As the number of programs of potential interest to the viewer has increased, a variety of electronic program guides have been developed to help the viewer select programs of particular interest. For example, commonly assigned U.S. Pat. Nos. 4,706,121 and 5,353,121 each describes schedule information processing systems which provide the viewer with a convenient way to select programs based on viewer supplied selection criteria.

Although electronic program guides alleviate many of the problems associated with selecting programs of interest from the wealth of available channels, some users prefer lower cost systems.

SUMMARY OF THE INVENTION

The system and method of the present invention provides a program schedule guide which displays less program information, thereby lowering the program cost. The program information to be displayed is received by a peripheral device which can either be a stand-alone device, such as a set-top box, or integrated into the user's television or VCR.

In a preferred embodiment of the invention, the program guide displays an abbreviated program schedule guide. In this embodiment, instead of allowing the user access to schedule information for every program being broadcast on the user's television system(s), the user has only limited schedule information access. The invention can either be designed to allow the user or the system operator to select the schedule information to be presented in this abbreviated mode.

In one embodiment, if the information is presented in an abbreviated format, the user may elect to pay more and get the full format.

In another embodiment of the invention, the program schedule guide only presents programs that are currently being broadcast and/or programs that are to be broadcast in the next thirty minute time slot.

In another embodiment, the user is able to view the schedule guide in either of two modes. In the first mode the schedule guide is displayed on the entire television screen. In the alternate mode, the schedule guide is displayed as an overlay partially covering the broadcast program on the TV screen. Thus in the alternate mode the user is able to view the schedule guide at the same time as they view the desired program.

In another embodiment of the invention, the program schedule guide and information is visually distinguished by color or font, thus making the guide more user friendly. Programs which are currently being broadcast can be designated a different color or font from programs which are to be broadcast during the next time slot. Programs can also be color coded by type, thus allowing the user to quickly differentiate between dramas, comedies, sports, news, etc. The program currently being viewed by the user and to which the television tuner has been set can also be coded by font or a different color.

The program guide can be easily upgraded to a guide system offering more user features. The upgrade can be purchased either through the system operator or through a local store. In one embodiment of the invention, the user can install the upgrade without requiring technical assistance from the system operator.

A further understanding of the nature and advantages of the present invention may be realized by reference to the remaining portions of the specification and the drawings.

DESCRIPTION OF THE PREFERRED EMBODIMENT

Figure 1:
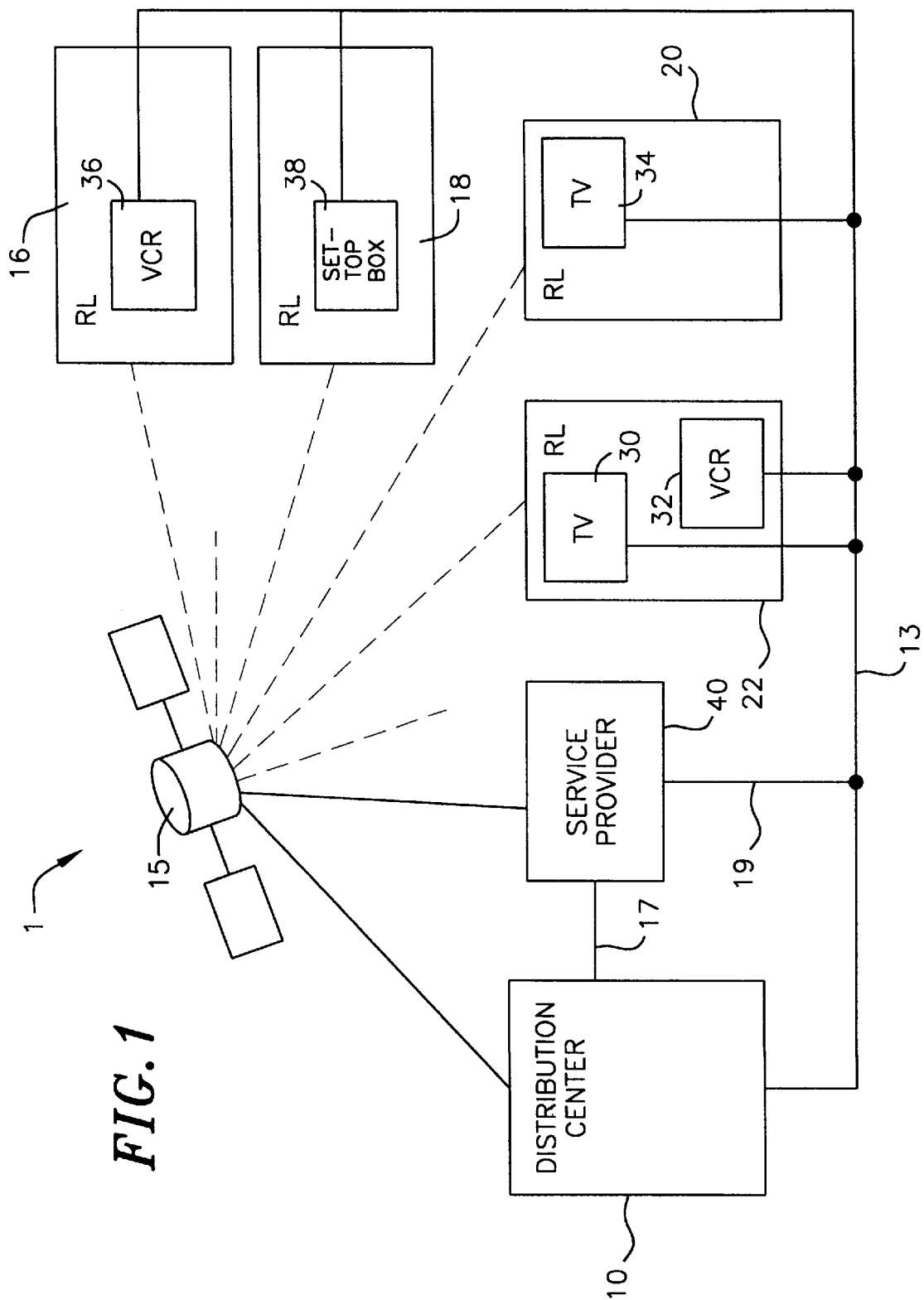
FIG. 1 illustrates a preferred embodiment of a TV/computer system on which a program schedule guide according to the present invention may be displayed.

The present invention provides a television (TV) schedule system which displays less program information, thereby lowering the program cost. FIG. 1 illustrates a preferred embodiment of TV/computer system 1 that displays a program schedule guide according to the present invention. As shown, system 1 includes a distribution center 10 and multiple receiving locations. Distribution center 10 compiles data for a data-stream. In a preferred embodiment, this data-stream is broadcast to receiving locations 16, 18, 20, and 22. Several methods are available for broadcasting the data-stream from distribution center 10 to receiving locations 16–22. For example, satellite 15 may broadcast this data-stream within the vertical blanking interval (VBI) of a television channel (e.g., PBS) or a dedicated channel to receiving locations 16, 18, 20, and 22. Alternatively, the data may be broadcast out of band, i.e., using non channel specific mechanisms. In another embodiment, the data-stream is provided to receiving locations 16, 18, 20, and 22 via transmission line 13. Transmission line 13 may be, for example, optical fiber, coax cable, telephone line, or the like.

In yet another embodiment, peripheral devices, which are located within the receiving locations, receive the data-stream from, for example, a local service provider 40. Service provider 40 receives the data-stream from distribution center 10 via line 17, and broadcasts the data-stream to the receiving peripheral devices via satellite 15 (or another satellite), or via lines 19 and 13. The receiving peripheral devices may be televisions 30, televisions 34, VCRs 32, VCRs 36, and/or set-top boxes 38. In still further embodiments, PCTVs may be utilized, or the data-stream may be provided to a personal computer for use with the computer and/or more of the above devices.

In the preferred embodiment, information in the data-stream includes TV schedule information. Software located within the peripheral devices utilize the schedule information provided in the data-stream to generate a schedule guide. The software is stored on a computer-readable storage medium such as a ROM, RAM, disk, or other storage device. If the schedule guide is in a grid format, for example, the available channels may be listed on the "y" axis and various times may be listed on the "x" axis. For more information on how the schedule system displays information, see U.S. Pat. No. B1 4,706,121 and U.S. Pat. No. 5,151,789. Both these patents, like the present patent application, are assigned to StarSight Telecast, Inc., and are hereby incorporated by reference in their entirety for all purposes.

Figure 2:
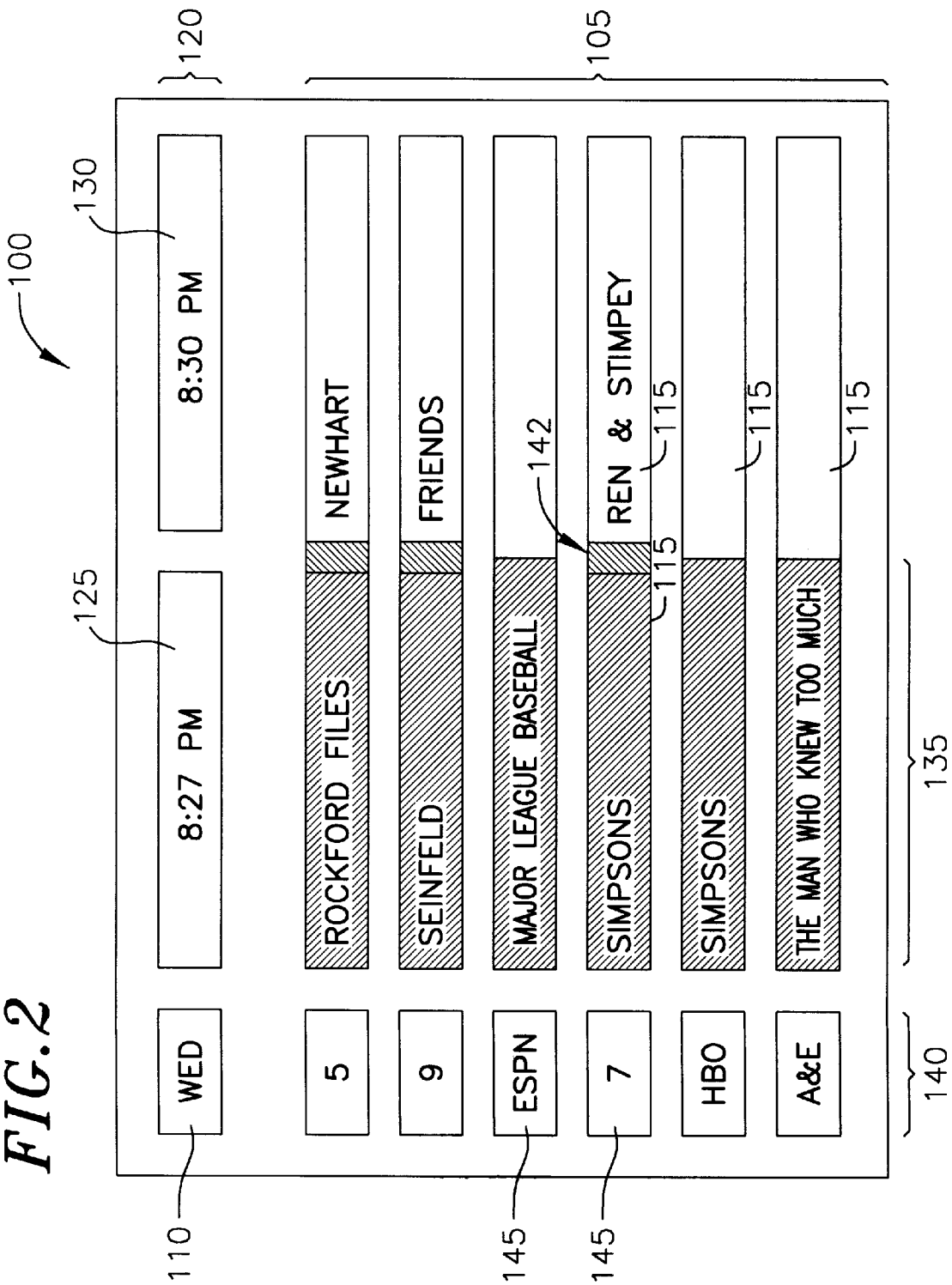
FIG. 2 is an illustration of a program schedule guide screen according to the present invention.

FIG. 2 is an illustration of a program schedule guide screen according to the present invention. As illustrated, program guide 100 substantially covers the display screen of the user's television monitor. The system may also be designed such that program guide 100 covers a portion of the screen, thus allowing the user to view both program guide 100 and a specific program simultaneously. According to one embodiment, the user may switch between a full screen display and an overlay screen to the current show via, for example, an on screen menu with cursor control. This feature allows a user to see a large scale version of the guide, or to be able to see the guide while also getting a "flavor" for a currently selected show through partial observation of the show. Preferably in this mode, the audio for the show also continues to be played.

A central portion 105 of guide 100 gives program schedule information for various channels. A cell 110 indicates the day of the week for which the program guide information shown in portion 105 is applicable. Portion 105 is divided into cells 115, the length of each cell representing the duration of the program in question. Next to cell 110 and above cells 115 is a header portion 120. Cells 125 & 130 within portion 120 indicate the program times which correspond to the programs shown in individual cells 115.

In one embodiment of the invention, cells 125 and 130 are the only time cells. Cell 125 shows the current ½ hour increment, thus every program cell 115 which falls below cell 125 would represent a program which is currently on. This allows the user to immediately recognize what programs are currently available for viewing. In order to make the currently available programs more readily apparent, a portion 135 of portion 105 which is directly below time cell 125 may be color coded or have some other visually distinguishing characteristic. For example, the program names shown in portion 135 may have a different font or size or background. Thus when program guide 100 appears on the user's television screen, the color coding or other visually distinguishing characteristic allows the user to immediately know which shows are available for viewing, i.e., current programs and future programs may be visually distinguished. Programs may also be visually distinguished according to subject content, language, whether they are re-runs or whether or not the programs are being viewed or recorded or scheduled for recording.

Time cell 130 indicates the next ½ hour increment immediately following the time shown in cell 125. Therefore if time cell 125 indicates a time of 8:27 PM as used in FIG. 2, time cell 130 indicates a time of 8:30 PM. All of the programs listed in cells 115 which fall directly below cell 130 are programs which are upcoming in the next ½ hour time slot. Therefore the user is able to immediately determine the programs which are about to be broadcast. If desired, program cells 115 falling below time cell 130 may be color coded with a different color from that used to code the programs presently being broadcast or otherwise visually distinguished. Future programs may also be visually distinguished according to subject content, language, whether they are re-runs or whether or not the programs are being viewed or recorded or scheduled for recording. Furthermore, by noting whether or not there is a cell division 142 lying directly below the division between time cells 125 and 130, the user is able to determine whether or not the show in question is beginning or already in play.

In one embodiment of the invention, it is not possible for the user to manipulate the program guide in order to obtain schedule information for programs beginning at a time after that indicated in cell 130.

Portion 140 of guide 100 contains cells 145. Each cell 145 indicates the channel number corresponding to the program guide cell 115 lying immediately adjacent to it in the program guide. Instead of, or in combination with the channel number, cells 145 may contain the program service name. For example, a cell 145 may contain the channel number 8, the service name HBO, or both.

In another embodiment of the invention, not all of the channels which are available on the user's television system are represented within program guide 100. The channels which are to be represented in the guide can either be selected by the user or by the system operator, depending upon how the system is configured. If the user designates the channels to be represented, channels which are seldom viewed can be "discarded", thus allowing the user to more efficiently review the program guide information. If the system operator designates the channels to be represented, then both time and cost savings may be realized since the system may provide less information.

The system operator can use a variety of criteria to determine which channels are to be represented. For example, only the most popular channels may be represented. The system operator may also charge each broadcaster an additional fee to be listed on this particular guide. The system operator may also charge an additional fee, per time slot, to make a specific program "special". A number of different schemes can be used to draw the user's attention to special programs. For example, the program may be listed first in the program guide, shown in a different typeface, presented in a different color, or given additional space for a program description.

Figure 3:
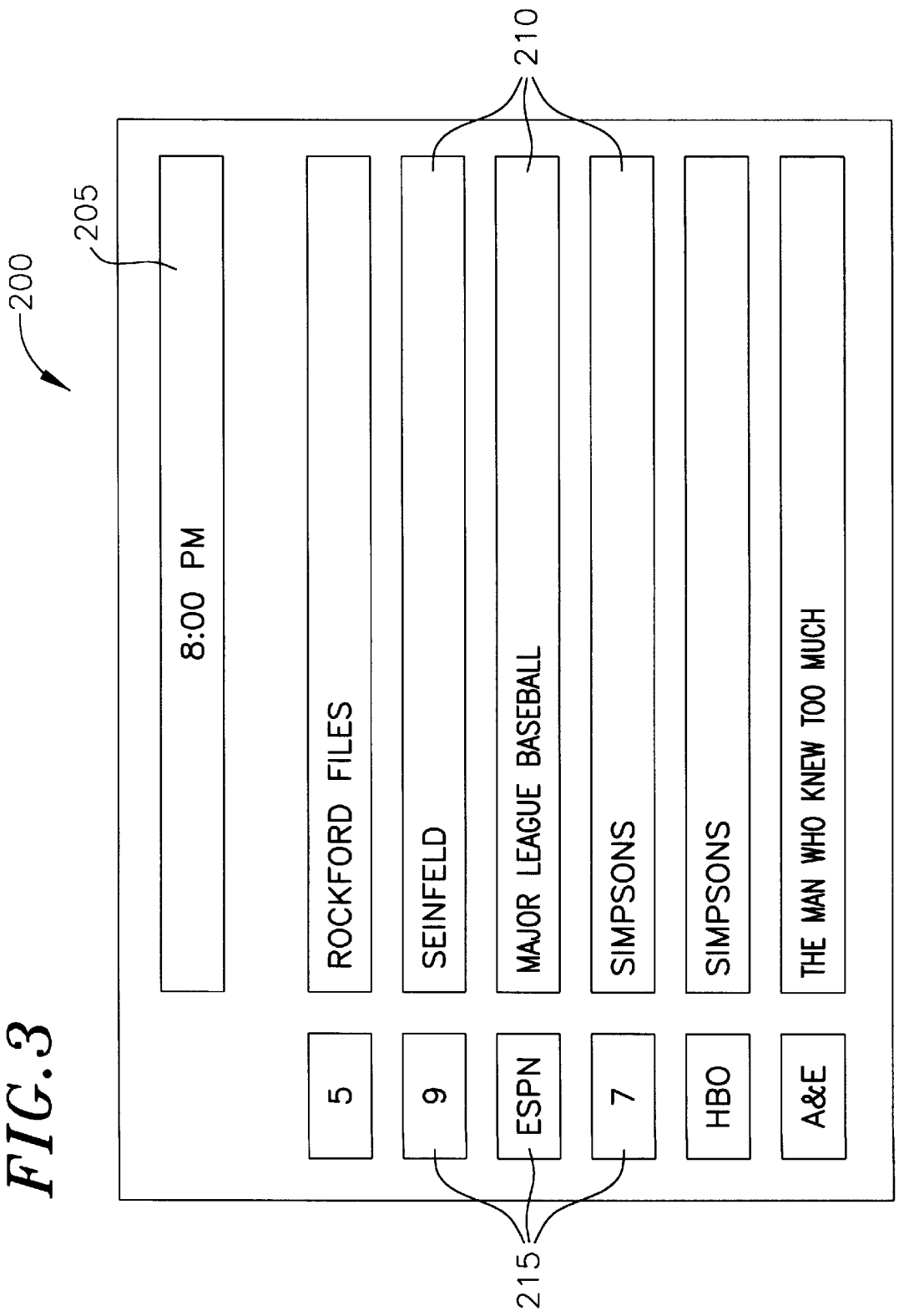
FIG. 3 is an illustration of an alternate embodiment of the program schedule guide screen which only provides schedule information for programs which are currently available for viewing.

In the preferred embodiment of the invention illustrated in FIG. 3, a program guide 200 only provides program schedule information for a single time period, that period representing programs which are presently available for viewing. A cell 205 indicates the time period for which program schedule information is provided. Cell 205 changes every half hour. The programs available for viewing during the designated time period are listed in a plurality of cells 210. Cells 215 indicate the channel number or service name for the corresponding cells 210. In this embodiment the program schedule information is preferably updated approximately 3 minutes before the half hour. Therefore if the time of day is 7:55 PM when the user requests program guide information, the program guide would provide information for the time period beginning at 7:30 PM. However, if the user waits until 7:58 PM to make the same request, the information provided by the system will be for programs starting at 8:00 PM. The system can be further configured to indicate to the user whether or not a program is continued from a previous time period and/or whether or not the program will be continued after the present half hour time increment. These aspects of the invention can be implemented by either color coding the particular cell in question or through the use of some other form of marking or notation.

Figure 4:
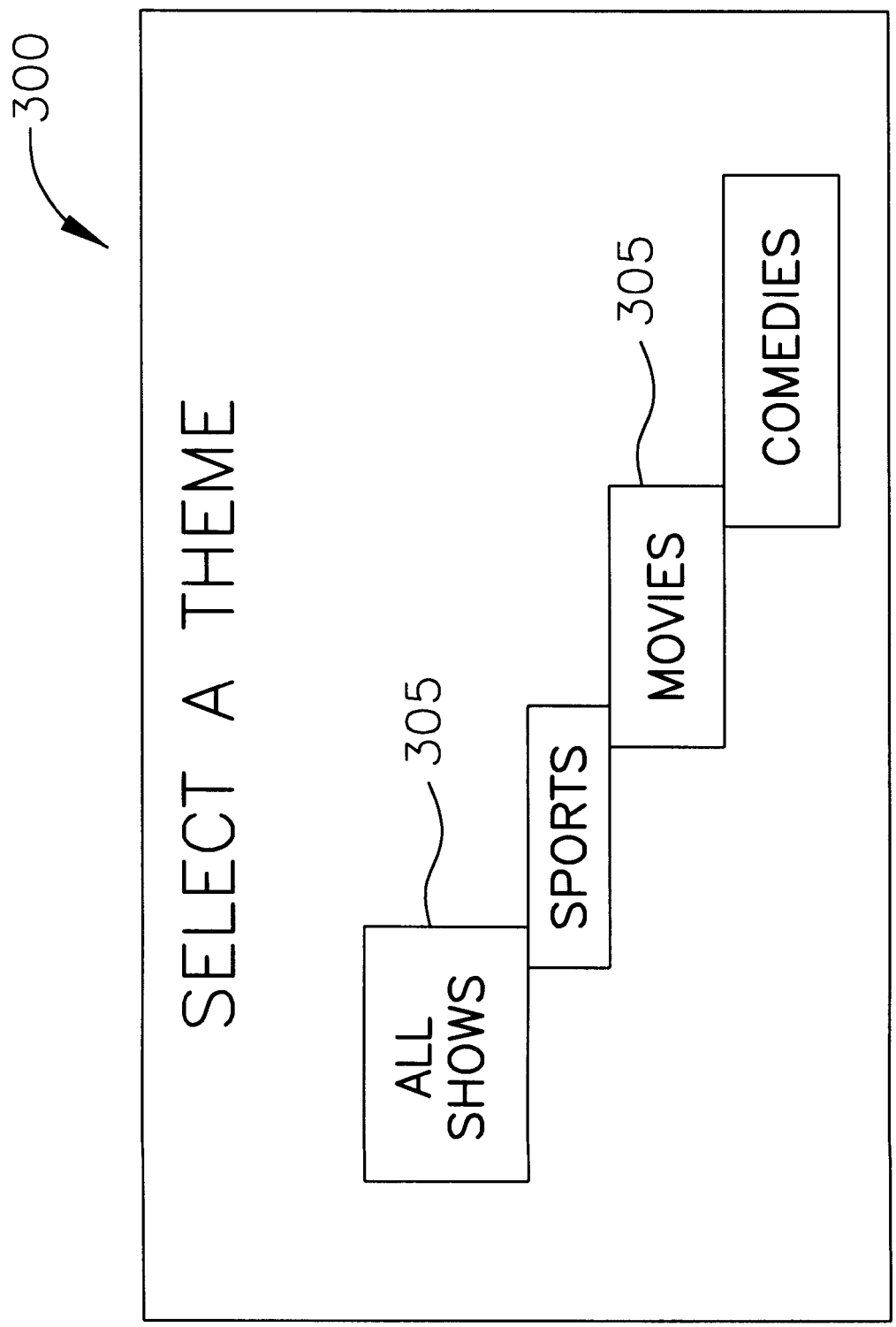
FIG. 4 is an illustration of a theme selection screen used in an alternate embodiment of the invention.

FIG. 4 is an illustration of a screen which may appear before program guide screen 100 or 200 in an alternate embodiment of the invention. Screen 300 appears on the user's television monitor when the user selects the program guide feature. The user is prompted to select a theme from a list of very broad categories shown in a portion 305 of screen 300. The subsequent program guide screen then supplies the user with all of the programs fitting the theme requirement for the times provided in the guide.

Figure 5:
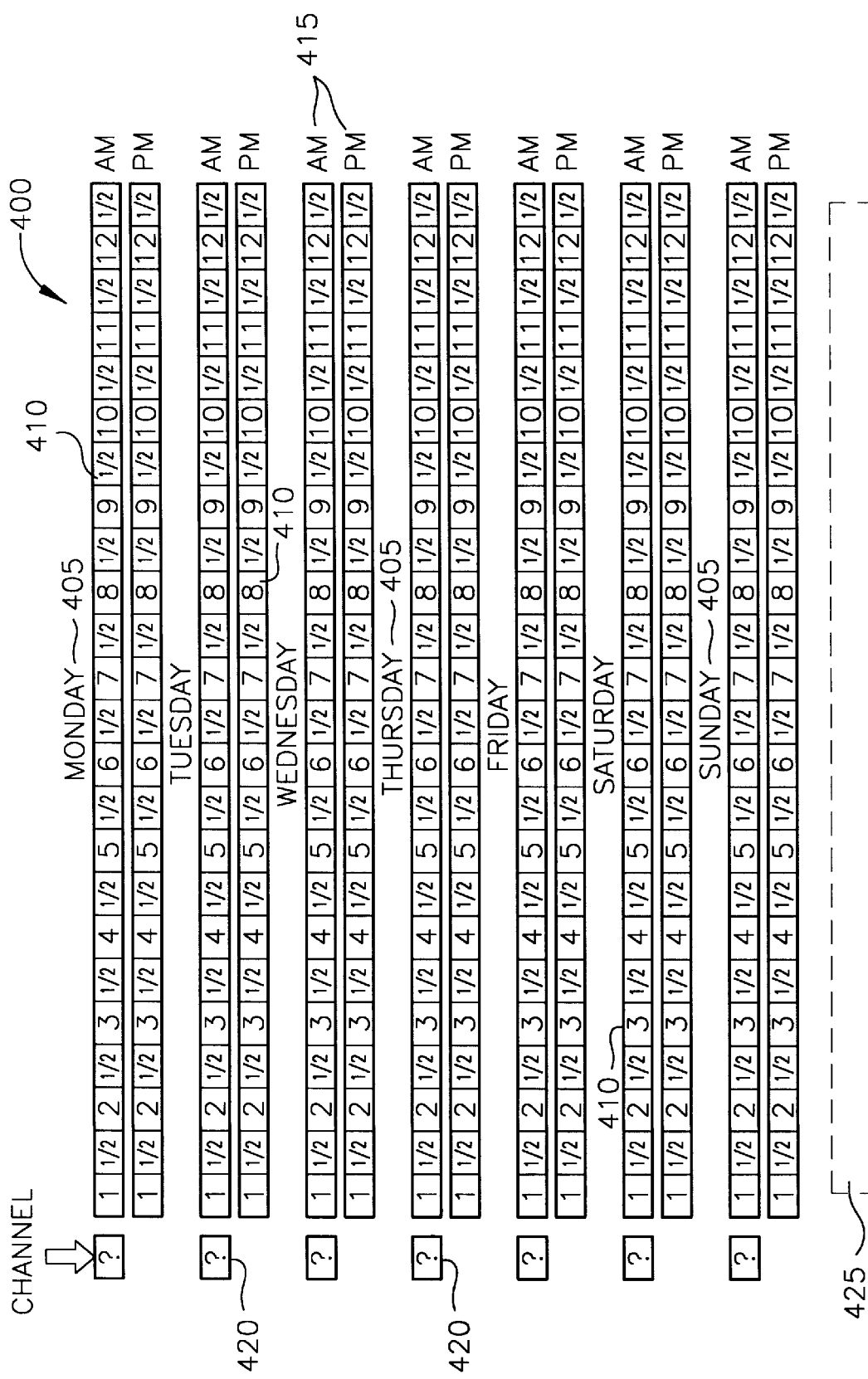
FIG. 5 is an illustration of a VCR programming screen in accordance with the present invention.

FIG. 5 is an illustration of a VCR programming screen 400 that may be used in combination with any of the previously described program guides. Screen 400 is divided into a seven day grid. The day of the week is indicated in cell 405. Adjacent to each day of the week is a linear grid 410 which divides each 24 hour day into 48 half hour increments. Due to the limited resolution of a standard television screen, grid 410 can be divided into several segments (e.g., 6, 8, or 12 hour segments), and the user may page through the grid to find the desired time slot. Grid 410 can also be limited to 12 hours, with the screen also having cells 415, which the user may use to indicate AM or PM.

In this embodiment the user first indicates the desire to program the VCR. Typically the initial program guide screen contains an icon labeled VCR. When the user selects this icon, screen 400 pops up. The user then selects the times over which recording is desired, for example by moving the cursor to the desired time slot and pressing ENTER. Thus if the user wishes to record a program on Thursday night starting at 9:00 PM and ending at 9:30 PM, the user simply moves the cursor to the 9:00 PM slot for Thursday night and presses enter. In the preferred embodiment, if the user wishes to record a program which lasts longer than 30 minutes, the user merely moves the cursor to each successive time slot and presses enter. After the user indicates a specific day and time period through the use of a cursor, the program guide requests that the user enter a channel number. Preferably screen 400 begins flashing a question mark (i.e., "?") in a cell 420 adjacent to the day of the week on which recording has been requested. Screen 400 can also request that the user indicate the channel using a message shown in a message portion 425 of screen 400.

After the user has indicated the time and channel for recording, the screen notifies the user with a message in portion 425 that the programming has been successfully completed. In addition, the message in portion 425 may also ask whether the user wishes to set the VCR for recording of another event. If the user has made a programming error, for example, by attempting to record multiple programs at the same time and day, a message in portion 425 notifies the user that the programming was not successfully completed.

Figure 6:
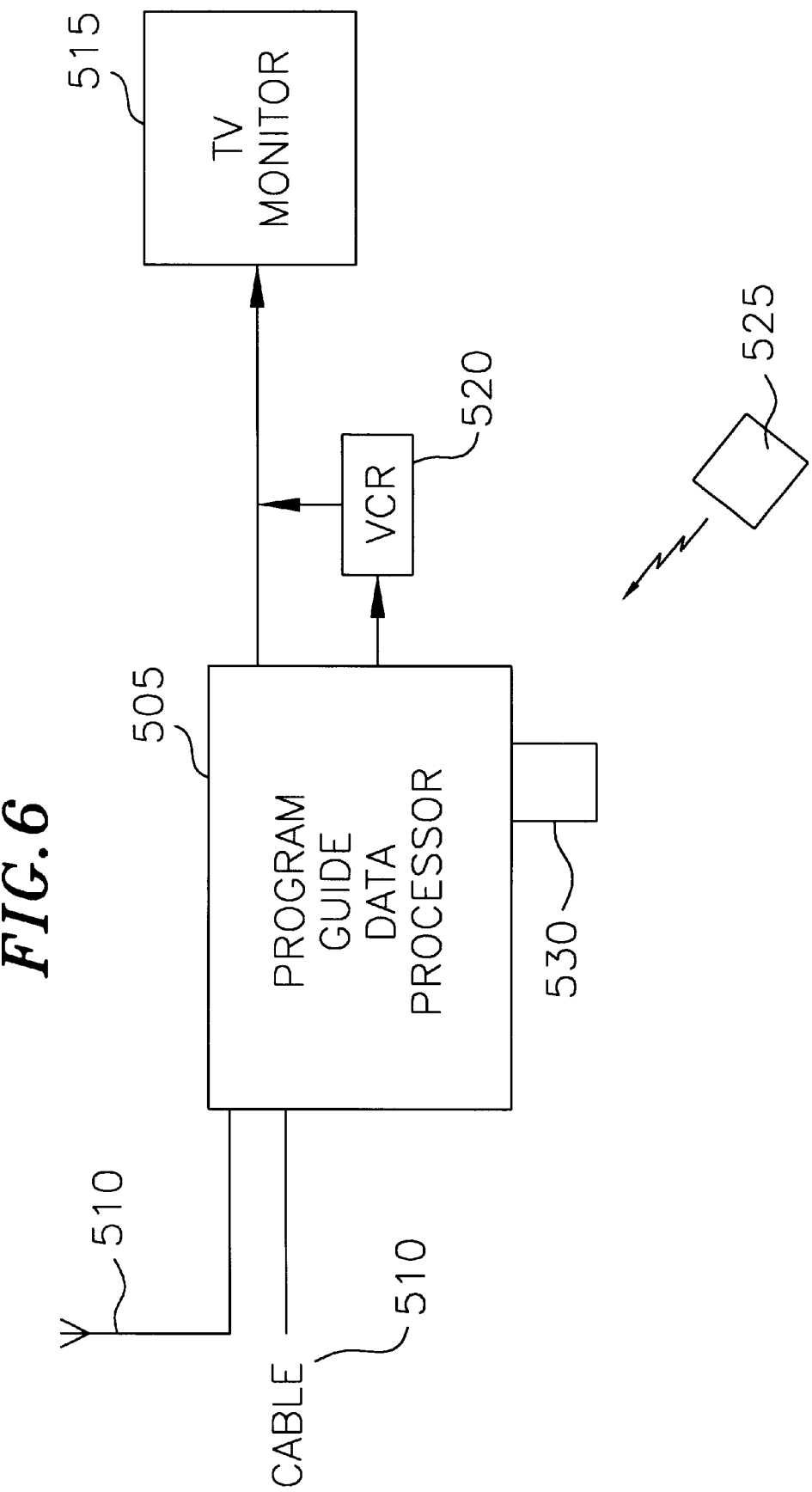
FIG. 6 is an illustration of a basic system configuration according to the present invention.

FIG. 6 illustrates the hardware elements of a preferred embodiment of the invention. As shown, the configuration utilizes a program guide controller 505 (for example, a data processor), one or more televisions sources 510, and a TV, PCTV or computer monitor 515. The system may also include a VCR 520 and a remote control 525. Program guide system 505 may be a stand-alone device or incorporated into another system such as a television, a cable decoder, computer, PCTV, or a VCR.

The preferred embodiment of the present invention includes a plug-in program guide controller module 530. Module 530 determines the extent of program guide 505's capabilities. Thus module 530 may only allow program guide 505 to present an abbreviated program schedule to the user, the abbreviated schedule showing a limited selection of channels covering a limited time span. For example, in this mode the program guide may contain no more than 20 channels, only showing what is currently on as well as what is to be broadcast during the next half hour increment for each of the selected channels. When the user wishes to upgrade program guide 505, for example, adding a 7 day program guide for all channels as well as detailed category searching, module 530 may be simply replaced with a different module authorizing more extensive guide capabilities. This embodiment has the distinct advantage of allowing the system to be significantly altered without requiring major hardware changes. For example, module 530 may be upgradeable by the user, thus not requiring the system operator to provide technical support. In this scenario the user would merely procure a different module 530, install the new module into the program guide system 505, and pay the new fee set by the system operator for the new benefits.

Preferably the system operates under the control of software 531 on a removable computer memory. The memory for software 531 may be located in one or more ICs, for example, the plug-in module of the data processor, or in ROM, RAM, or a combination of the two. Accordingly, the disclosures and descriptions herein are intended to be illustrative, but not limiting, of the scope of the invention which is set forth in the following claims.

What is claimed is:

1. A method of operating a schedule guide system comprising:

storing data containing television schedule information, including titles of current and future television shows for particular channels in a computer readable memory;

inputting a user command for selectively controlling whether a schedule guide is displayed over substantially all of a screen or partially overlaid over a current television show to which a television receiver is tuned;

selectively displaying a plurality of cells listing a portion of the guide based on said stored data and the television shows presently available for viewing over substantially all of said screen or as an overlay to a current television show based on said user selection; and visually distinguishing portions of cells corresponding to portions of current television shows in play from cells corresponding to future television shows and portions of cells corresponding to portions of current television shows yet to be played.

2. The method of claim 1 wherein the visually distinguishing current television shows from future television shows is performed by color coding portions of the cells corresponding to portions of the current television shows in slay with one color and the cells corresponding to future television shows and portions of cells corresponding to portions of current television shows yet to be played with another color.

3. The method of claim 1 wherein said television schedule information is updated every half hour a few minutes before the half hour.

4. The method of claim 3 wherein the television schedule information is updated approximately three minutes before the half hour.

5. The method of claim 1 further comprising displaying a cell division line between television shows to indicate that a show is beginning or is already in play.

* * * * *

UNITED STATES PATENT AND TRADEMARK OFFICE
CERTIFICATE OF CORRECTION

PATENT NO.   : 6,118,492
DATED        : September 12, 2000
INVENTOR(S)  : Kenneth A. Milnes and Steven M. Schein Page 1 of 1

It is certified that error appears in the above-identified patent and that said Letters Patent is hereby corrected as shown below:

<u>Column 6,</u>
Line 49, replace "slay" with -- play --.

Signed and Sealed this

Twenty-third Day of April, 2002

Attest:

JAMES E. ROGAN
*Attesting Officer*  *Director of the United States Patent and Trademark Office*